US006797916B2

(12) United States Patent
Feikus

(10) Patent No.: US 6,797,916 B2
(45) Date of Patent: Sep. 28, 2004

(54) LIGHT METAL CYLINDER BLOCK, METHOD OF PRODUCING SAME AND DEVICE FOR CARRYING OUT THE METHOD

(75) Inventor: Franz Josef Feikus, Bonn (DE)

(73) Assignee: VAW Aluminium AG, Bonn (DE)

(*) Notice: Subject to any disclaimer, the term of this patent is extended or adjusted under 35 U.S.C. 154(b) by 48 days.

(21) Appl. No.: 10/171,028

(22) Filed: Jun. 12, 2002

(65) Prior Publication Data

US 2002/0153359 A1 Oct. 24, 2002

Related U.S. Application Data

(62) Division of application No. 09/992,797, filed on Nov. 14, 2001, now Pat. No. 6,575,130, which is a division of application No. 09/727,366, filed on Nov. 30, 2000, now Pat. No. 6,390,050, which is a continuation of application No. PCT/EP00/02125, filed on Mar. 10, 2000.

(30) Foreign Application Priority Data

Apr. 1, 1999 (DE) ........................................ 199 15 038

(51) Int. Cl.[7] ............................ B23K 26/34; F02F 1/00
(52) U.S. Cl. ................................................ 219/121.65
(58) Field of Search ......................... 219/121.6, 121.63, 219/121.64, 121.65, 121.66, 121.73, 121.74, 121.75; 123/193.2, 195 R

(56) References Cited

U.S. PATENT DOCUMENTS 5,182,430 A * 1/1993 Lagain .................. 219/121.63
5,287,622 A * 2/1994 Terai ......................... 29/890.1

* cited by examiner

*Primary Examiner*—Samuel M. Heinrich
(74) *Attorney, Agent, or Firm*—Darby & Darby

(57) ABSTRACT

The present invention includes a light metal cylinder block comprising a cylinder running face which is coated with silicon. The invention also includes a method by which the silicon is applied to the running face comprising melting powder metal silicon, which is fired at the face in a powdered metal beam, under heat of a laser which is fired at the running face at the point of impact of the powdered beam. Furthermore, the invention includes a device with which the cylinder block may be manufactured.

3 Claims, 3 Drawing Sheets

LIGHT METAL CYLINDER BLOCK, METHOD OF PRODUCING SAME AND DEVICE FOR CARRYING OUT THE METHOD

This is a division, of application Ser. No. 09/992,797, filed Nov. 14, 2001, now U.S. Pat. No. 6,575,130 which is a division, of application Ser. No. 09/727,366, filed Nov. 30, 2000, now U.S. Pat. No. 6,390,050 which is a continuation of International Application Serial No. PCT/EP00/02125, filed Mar. 10, 2000, which claims priority of German application No. 199 15 038.9-45, filed Apr. 1, 1999. Each of these prior applications is hereby incorporated herein by reference, in its entirety.

FIELD OF THE INVENTION

The invention relates to a light metal cylinder block having at least one wear-resistant and tribologically optimised cylinder running face, comprising a light metal matrix alloy and a powder material which contains a hardening material and which is present on the light metal matrix in the form of a finely dispersed surface layer containing primary silicon precipitations. The invention also relates to a method by which to produce the blocks and a device with which to produce the blocks.

BACKGROUND OF THE INVENTION

According to EP 0 837 152 Al (Bayerische Motoren Werke AG), there is known a method of coating a component of an internal combustion engine, which component consists of an aluminium alloy. A laser beam is directed in such a way that it does not directly reach the surface of the component to be coated, but first hits a powder beam. As a result of the energy of the powder beam, the powder is transformed completely from the solid phase into the liquid phase, so that the powder, when hitting the component surface, is separated in the form of fine droplets as a coating material on the component surface, which fine droplets, as a result of the solidification conditions, solidify so as to be partially amorphous.

Therefore, in the case of the prior art method, the powder is not alloyed into the surface layer of the component, but there takes place a phase transformation of the coating material on its way to the surface with the aluminium silicon powder being liquefied in the laser beam. When the powder solidifies on the surface the object is to release a finely dispersed silicon, a so-called primary silicon.

Depending on the cooling speed, the purpose is to produce silicon crystals whose size ranges between 1 to 5 μm. However, rapid cooling, as required, cannot be achieved in practice because of the energy of the laser beam acting on the component to be coated. In consequence, the substrate surface heats up very quickly and therefore cannot discharge the heat of the arriving Si melt quickly enough, so that instead of a crystalline phase and primary crystals, there occurs an amorphous phase.

In accordance with the embodiment of the BMW patent, in the case of an applied layer thickness of 3 mm, approximately 50% are removed to achieve a smooth, planar surface of the coating material (column 6, lines 10 to 15). This means high removal losses and an unused boundary zone as a result of the pronounced waviness of the material applied drop-wise, which constitutes an additional disadvantage.

Furthermore, it is known from EP-A-0 221 276 to render an aluminium alloy more wear-resistant by remelting its surface layer by laser energy. A layer consisting of a bonding agent, silicon in powder form, copper and titanium carbide is applied to the surface and subsequently melted into the surface by laser. According to the embodiments listed, TIC is added in amounts ranging between 5% and 30% and achieves a considerable increase in the surface hardness. However, from a tribological point of view the extremely high cooling speed during laser remelting achieves a high degree of core fineness, but a sufficient amount of primary silicon cannot be produced with this method. Therefore, laser remelting is not suitable for producing cylinder running faces of reciprocating piston engines consisting of AlSi alloys with supporting plateaus of primary silicon and set-back regions containing lubricants.

EP 0 411 322 describes a method for producing wear-resistant surfaces of components made of an AlSi alloy, which method is based on the previously mentioned EP 0 211 276, but prior to carrying out the laser remelting process, the layer is provided with an inoculation agent (germ forming agent) for primary silicon crystals. The following substances are mentioned as inoculation agents or germ forming agents: silicon carbide, titanium carbide, titannitride, boron carbide and titanium boride.

In a preferred embodiment, the coating is produced by silk-screen technology in the form of a peel-off coating and applied to the surface of the component concerned. The coating thickness can preferably amount to 200 μm and the melting-in depth can amount to 400 to 600 μm. Use is made of a linearly focused laser beam in an inert atmosphere to be able to achieve a melting-in depth of 400 μm. In the example given, the silicon content in the alloyed zone amounted to 25% with a nickel content of 8% (hardness in excess of 250 HV).

As already mentioned above, it is necessary, in the case of the latter processes of remelting and melting-in, to carry out a cooling process while applying a coating on to the matrix alloy in order to achieve the required finely dispersed segregations of primary silicon. Because of the addition of inoculation agents reactions can take place on the aluminium surface. In addition, the coating measures cannot always be applied to curved surfaces.

EP 0 622 476 Al proposes a metal substrate with a laser-induced MMC coating. The MMC coating comprises a coating thickness between 200 μm and 3 mm and contains homogeneously distributed SIC particles; in a preferred embodiment, up to 40% by weight of SiC is contained in the MMC coating in the form of homogeneously distributed SIC particles. For production purposes, the powder mixture containing SiC powder and pre-alloyed AlSi powder is heated in a laser beam, with the heat content required for producing a homogeneous alloy from the powder mixture being provided by the powder applied to the substrate. Products containing hard metal materials such as SiC comprise a very high hardness which is disadvantageous for the wear behaviour of the piston rings. Furthermore, machining is very complicated and expensive because the top layer of the ceramic particles has to be removed in order to achieve a functionable, splinter-free running face.

SUMMARY OF THE INVENTION

The invention includes a light metal cylinder block having at least one wear-resistant and tribologically optimized cylinder running face, comprising a light metal matrix alloy with a finely dispersed surface layer containing primary silicon phases, wherein the primary silicon comprises uniformly distributed approximately roundly formed grains with a medium grain diameter ranging between 1 and 10 μm and wherein the surface layer contains about 10 to about 14% AlSi eutectic, about 5 to about 20% primary silicon, the remainder being pure Al phase, and wherein the minimum hardness of the surface amounts to about 160 HV.

Furthermore, the invention includes a method of producing a light metal cylinder block having at least one wear-resistant and tribologically optimized cylinder running face, comprising a light metal matrix alloy and a powder material which contains a hard material and which is present in the form of a finely dispersed surface layer with primary silicon precipitations in the light metal matrix, using a gravity, low-pressure or high-pressure die casting method with subsequent surface treatment by parallel laser and powder beams wherein the laser beam is guided in a strip width of at least 2 mm transversely to the direction of feed across the matrix surface and wherein it is only in the point of impact of the laser beam on the light metal matrix surface in a contact time of 0.1 to 0.5 seconds, that the powder is heated to melting temperature and diffused in.

The invention also includes a device for coating the a running surface of a hollow cylinder, comprising powder supply means (1), a laser beam device (2) and a focusing system (3) with a deflecting mirror (4), characterized in that the powder supply means (1) and the laser beam device (2) are guided parallel relative to one another in the radial and axial direction of the hollow cylinder; that the focusing system (3) comprises a linear beam exit with a beam width of 2.0 to 2.5 mm; and that the powder supply means are provided with a metering device by means of which the volume flow of the powder can be set as a function of the speed of feed of the laser beam.

DETAILED DESCRIPTION OF THE INVENTION

Figure 1:
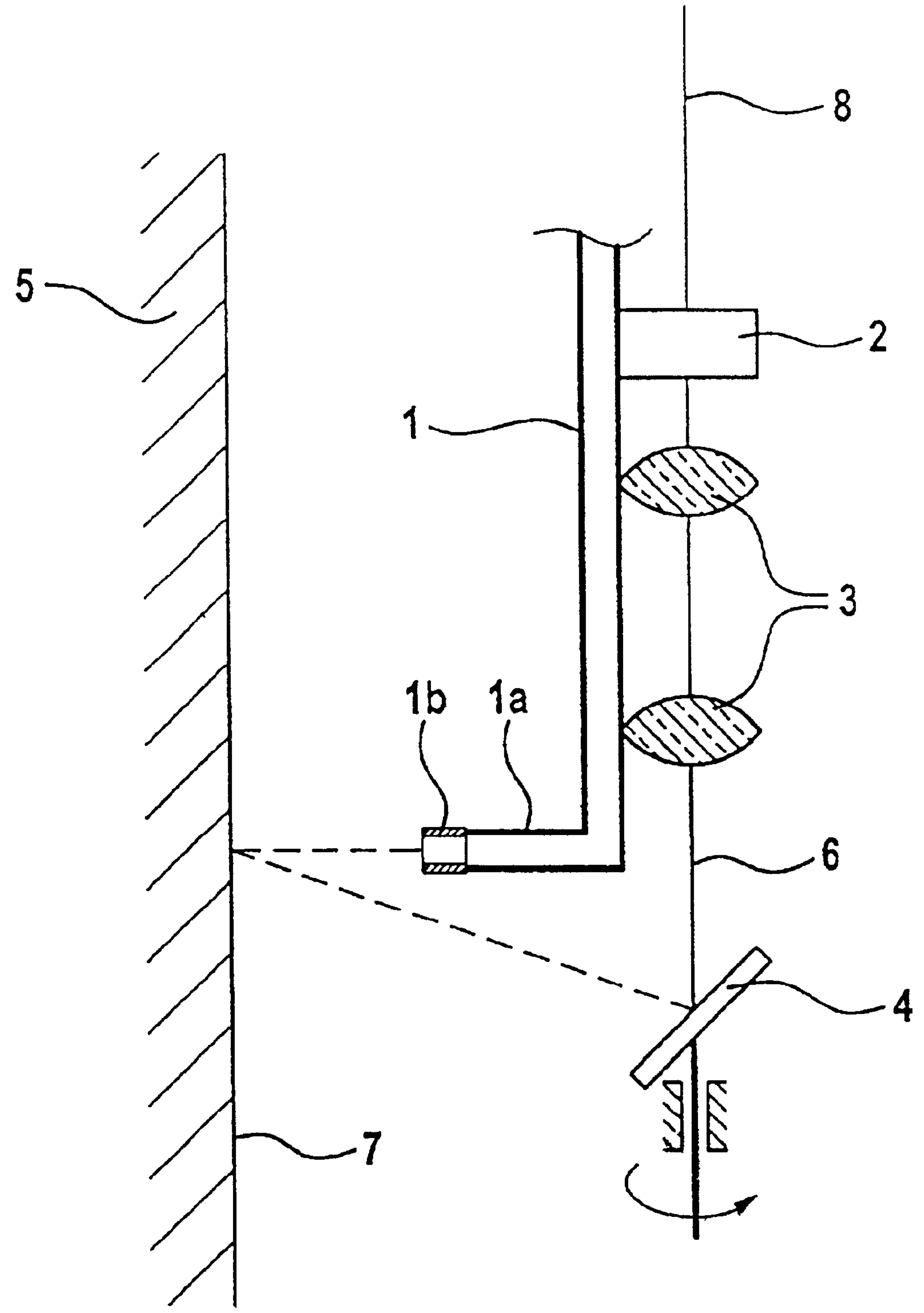
FIG. 1, in the form of a partial cross-section, illustrates the principle of a coating device designed in accordance with the invention.

It is an object of the present invention to develop a light metal cylinder block having at least one wear-resistant and tribologically loadable running face, wherein the surface layer comprises about 5 to about 20% of finely dispersed primary silicon which, in the region of transition to the matrix alloy, comprises a narrow boundary zone width and which is free from defects and oxide inclusions in the transition zone. Preferably the block comprises a finely dispersed surface layer containing primary silicon phases, wherein the primary silicon comprises uniformly distributed approximately roundly formed grains with a medium grain diameter ranging between about 1 and about 10 $\mu$m and wherein the surface layer contains about 10 to about 14% AlSi eutectic (e.g., 10, 11, 12, 13 or 14%), about 5 to about 20% primary silicon (e g., 5, 6, 7, 8, 9, 10, 1, 12, 13, 14, 15, 16, 17, 18, 19 or 20%), the remainder being pure Al phase, and wherein the minimum hardness of the surface amounts to at least about 110 HV. preferably at least about 160 HV. Furthermore, the silicon primary phases in the coated block may be distributed in the surface layer at a distance of 1–5 times (e.g., 1, 2, 3, 4 or 5 times ) the primary phase diameter. The primary silicon may be arranged in a strip-like manner wherein the strip width is about 2 mm or more (e.g., 2, 3, 4, 5, 6, 7, 8, 9, 10, 11 or 12 mm or more), preferably, about 2 mm to about 4 mm. The thickness of the strip may be about 150 $\mu$m to about 650 $\mu$m. The strips may also overlap wherein the width of overlap is from about 5% to about 10% (e.g., 5, 6, 7, 8, 9 or 10%) of the total strip width.

A method used for producing the light metal cylinder blocks should have fewer process stages, and a subsequent chemical treatment is to be eliminated completely.

The objective is achieved by the characteristics given in the claims. Below, several embodiments will be referred to; they represent preferred applications of the laser alloying method in accordance with the invention.

First, a device for coating the interior of a light metal engine block made of aluminium or a magnesium alloy, wherein a probe in lowered into the cylinder of the engine block with pure silicon powder being introduced at the same time will be described. The probe comprises powder supply means and a laser beam device.

A rotary drive arranged at the probe directs a powder ejection nozzle and an energy beam on to the interior (i.e., the running face of the light metal cylinder block).

The purpose of this device is to alloy hard material particles in the form of silicon by means of a laser beam rotating spiral-like across the running face into silicon particles supplied in parallel. To ensure that the laser energy is distributed over a wide track on to the matrix surface, the laser beam comprises a linear focus with a track width about 2 mm or more (e g, 2, 2, 5, 3, 4, 5, 6, 7, 8, 9, 10, 11 or 12 mm or more), preferably about 2 to about 4 mm. As compared to a surface produced by a spot beam, a focus does not result in a wavy profile, but in a flat band with finely dispersed primary silicon particles. The band is referred to as alloyed-on zone and there is only a narrow transition zone (of the boundary zone) between the alloyed-on zone and the matrix metal (see FIG. 1). The alloyed-on zone may penetrate the face at any depth; for example, 100, 200, 300, 350, 400, 500, 600, 700, 750, 800, 850, 900, or 1000 $\mu$m.

The powder comprises a grain structure shortly before hitting the metal matrix alloy and is melted and alloyed-in only when coming into contact with the metal matrix alloy in the region of the laser beam within a contact time of about 0.1 to about 0.5 seconds (e.g., 0.1, 0.2, 0.3, 0.4 or 0.5 seconds), so it is possible, by means of the linear focus, to achieve a small boundary zone percentage of approx. 10%. The powdered metal beam may be fed at a rate of about 0.8 to about 4.0 meters per minute (e.g., 0.8, 1, 1.2, 1.5, 2, 2.5, 3, 3.5, or 4 meters per minute). The laser may be focused to have an impact area of about 1 $mm^2$ to about 10 $mm^2$(e.g., 1, 2, 3, 4, 5, 6, 7, 8, 9 or 10 $mm^2$) with a laser light output of about 3 kW to about 4 kW (e.g., 3, 3.25, 3.5, 3.75 or 4 kW). The light metal matrix alloy, at the point of beam impact, may be fully melted, at a depth of about 350 $\mu$m or more (e.g., 350, 375, 400, 450, 500, 600, 700, 800, 850 or 900 $\mu$m), and transferred to a plasma condition. The melted powder may form an alloyed-on zone which comprises a layer thickness of about 500 $\mu$m to about 1000 $\mu$m (e.g., 500, 600, 700, 800, 900 or 1000 $\mu$m). The laser track is lowered spiral-like in the cylinder bore, and overlapping can be eliminated, if necessary, so that the effective parts practically about one another. There is thus produced a smooth, completely homogeneous surface layer which only needs to be finished by precision machining to eliminate a slight waviness.

As an example of the inventive machining operation applied when producing light metal cylinder blocks with at least one wear-resistant, tribologically optimised cylinder running face, the following machining stages take place:

First, an alloyed-on zone containing primary silicon with a mean layer thickness of about 300 to about 750 μm (e g, 300, 350, 400, 450, 500, 550, 600, 650, 700 or 750 μm) is produced in the matrix alloy. The exact values of the layer thickness depend on different influencing factors such as process parameters, positioning accuracy of the device and dimensional tolerances of the casting. Therefore, when thicknesses are given below, reference is always made to a "mean" layer thickness, and the tolerance range can be kept very narrow because the device can be centered at the component. The alloyed-on zone may be applied in strips wherein the strip width is about 2 mm or more (e.g., 2, 3, 4, 5, 6, 7, 8, 9, 10, 11 or 12 mm or more), preferably, about 2 mm to about 4 mm.

In a further machining stage, the starting layer thickness of about 300 to about 750 μm is then reduced by precision machining, such as honing, to the required end layer thickness by removing up to about 150 μm. The alloyed-on zone may be honed directly without an intermediate machining operation. Preferably, the uppermost layer of alloyed-on zone which is removed does not exceed about 30% of total layer thickness (e.g., 5, 10, 15, 20, 25 or 30%). The end layer thickness achieved by the inventive method ranges between about 150 and about 650 μm (e.g., 150, 200, 250, 300, 350, 400, 450, 500, 550, 600 or 650 μm). The layer is a pure diffusion layer characterized by a structure, especially as defined in claims 1 and 2.

The segregation values of the hard phases can be set by controlling the powder supply, the laser beam feed and the laser energy supplied. In the case of precipitation values smaller than about 10 μm, the destruction depth while finish-machining the hard phases is reduced, so that the previously required machining allowances for removing the destroyed hard phases can be reduced considerably. (The destruction depth is determined by the hard phases which are contained in the top layer and which are not firmly bonded in)

By using the laser beam for alloying-in purposes, the surface is hardened, with surface layer hardness values of at least about 110 HV, preferably about 160 HV or more (e g., 110, 130, 145, 160, 200, 300, 400 or 500 HV) being achieved. Because of the good hardening results, the laser-treated surfaces can be honed directly. Furthermore, previously required additional mechanical and chemical treatment stages for exposing the hard phases are no longer necessary. This also means that it is no longer necessary to bore out the cylinder coatings because, depending on the degree of overlap of the strip-like alloyed-on zone, the surface waviness is negligibly small.

Below, the surface structure achievable in accordance with the invention on an engine block running face will be described in greater detail with reference to a comparative example.

As illustrated in FIG. 1, the coating device designed in accordance with the invention comprises powder supply means 1 which, at their end 1*a*, comprise a nozzle 1*b* directed towards the running face 5.

The energy is supplied by, a laser beam device 2, a focusing system 3 and a deflecting mirror 4 which ensure that the laser beam does not meet the powder close before it hits the running face surface 7.

According to the known laws of optics, the laser beam 6 is focused so as to be linear, preferably X-, I- or 8-shaped and then copied on the running face surface 7, for example by tilting the mirror. The amount of energy introduced can be controlled by the form of the copy, so that the precipitation structure can be influenced at the boundaries.

By turning the mirror 4, the laser beam 6 moves across the running face surface 7, so that a strip-like band is obtained. If, at the same time, the laser beam 6 is moved forward towards the cylinder axis 8, the overlapping of the two movements results in a spiral-like coating on the running face surface 7. The rotating movement and the translatory movement towards the cylinder axis 8 should be adjusted to one another in such a way, that the windings of the spiral are close together, thus achieving a closed alloyed-on zone.

Figure 2:
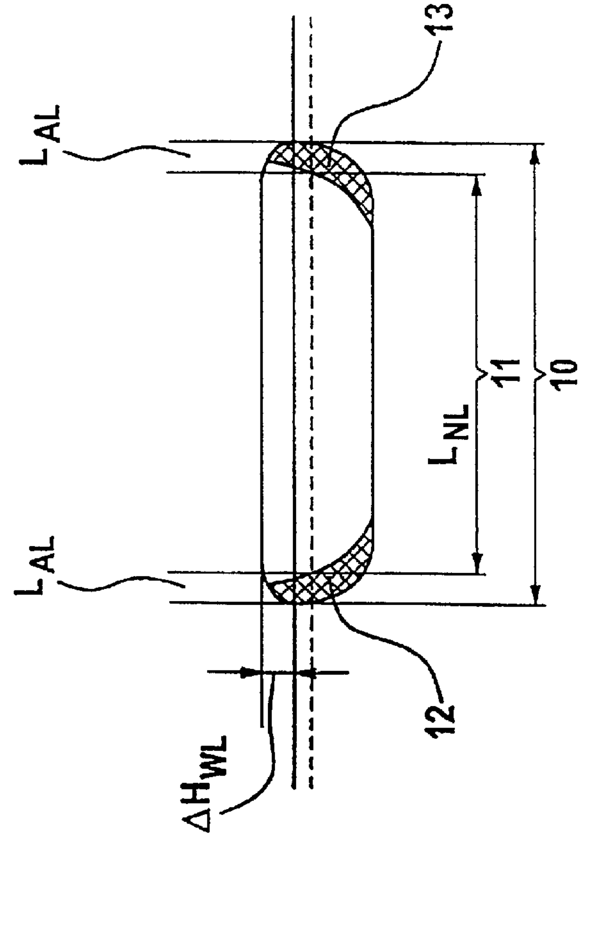
FIG. 2 illustrates the principle of a surface layer produced in accordance with the invention.

FIG. 2 shows the alloyed-on zone 10 produced with a linear focus in accordance with the invention and including a zone 11 high in precipitations and laterally arranged zones 12, 13 low in precipitations. FIG. 2 shows the condition of the alloyed-on zone directly after laser treatment, and it can be seen that the percentage of the zone $L_{AL}$ low in precipitations is relatively low, relative to the effective length $L_{NL}$ of the zone which is high in precipitations. The respective regions in FIG. 3 have been given the reference symbol $L_{AK}$ and are associated with the interface zones 15, 16, 17.

Figure 3:
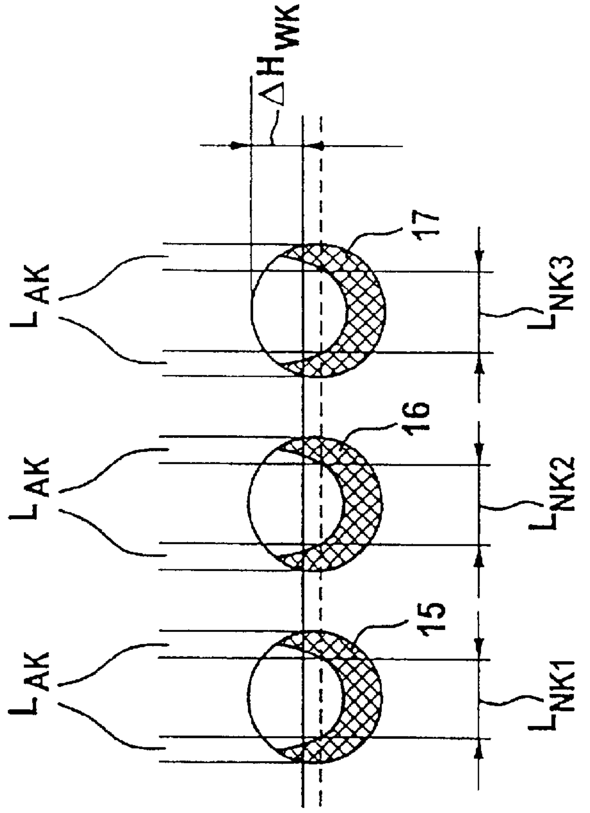
FIG. 3 shows a comparative example having a different surface structure.

For comparative purposes, FIG. 3 shows three alloyed-on zones produced with a conventional circular focus. The coating width produced by a linear focus is approximately identical to that produced by a circular focus. It can be seen that in the case of the method using a circular focus, the effective length $L_{NK}$ of the structure high in precipitations is considerably shorter than the effective length $L_{NL}$ achieved by a linear focus. Furthermore, in the case of a circular focus, the effective depth of the hardened surface layer is very much shorter than in the case of the linear focus, because in the case of the circular focus, a structure low in precipitations extends down to the deeper zones of the cylinder block structure. This is illustrated in the cross-section according to FIG. 3 by the wide interface zones 15, 16, 17.

As with the same depth of penetration, the effective depth in the comparative example according to FIG. 3 is shorter than in the inventive example according to FIG. 2, the coating quality in the comparative example is lower. Furthermore, with the machining depth being the same in the comparative example and in the example according to the invention, the amount of material $\Delta H_{WK}$ having to be removed in the comparative example is considerably higher ($\Delta H_{WL}$) because the circular focus produces a wavy surface layer which, in the region of the running face, comprises a smaller effective material percentage $M_K$ than a corresponding running face portion according to FIG. 2 ($L_{NL}$).

The effective material percentage amounts to $L_{NL}$ in the example according to the invention, whereas $M_K$ is formed as the sum of the individual values $L_{NK1}$, $L_{NK2}$, $L_{NK3}$ The inventive light metal cylinder block therefore comprises a wear-resistant cylinder running face which is tribologically optimised as a result of the uniform distribution of the fine Si primary precipitations and which, due to linear focusing and overlapping treatments, can be produced at reduced production costs.

Figure 4:
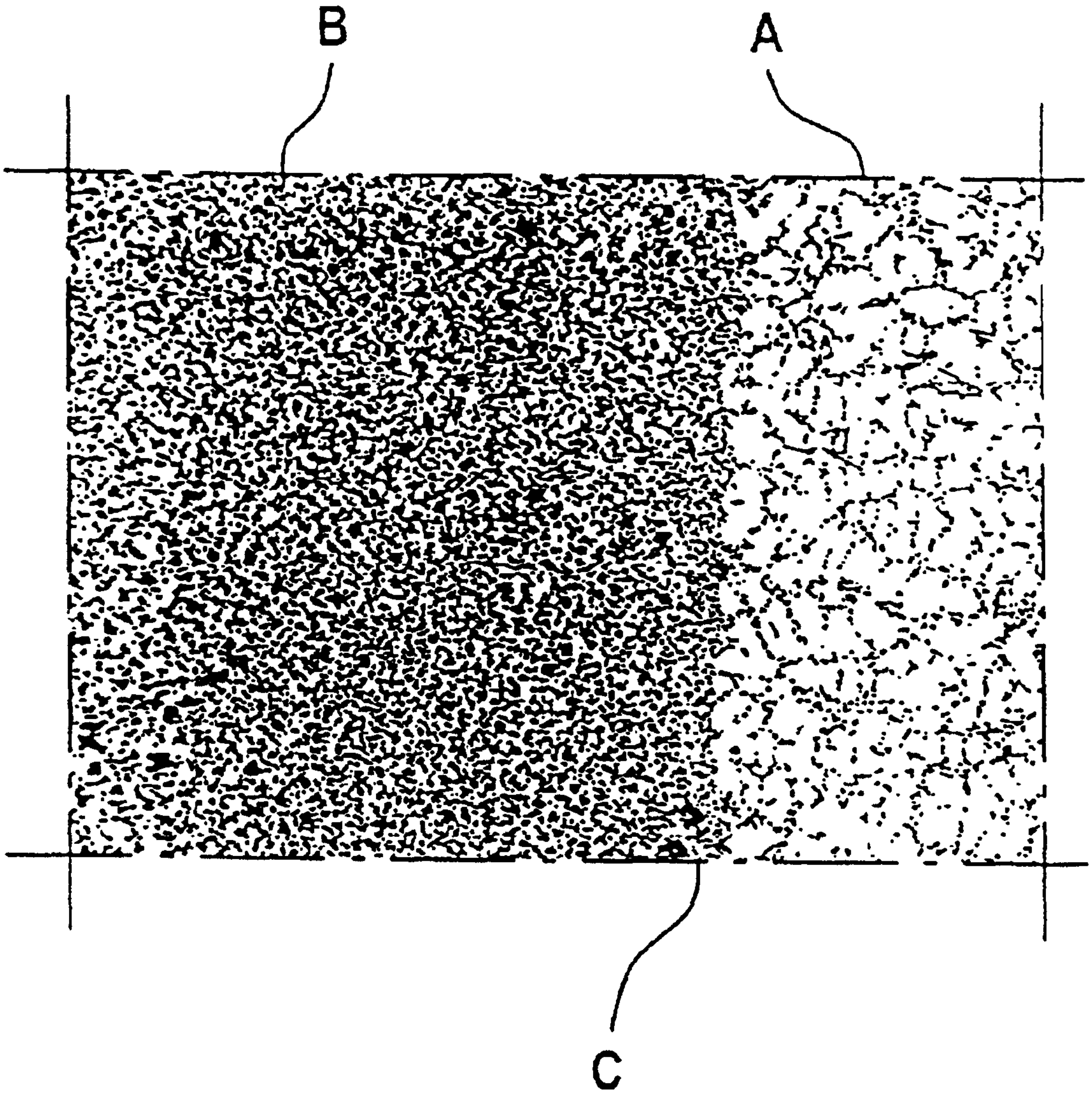
FIG. 4 is a cross-section of a casting in the region of the laser-alloyed zone.

This is illustrated by the structure shown in FIG. 4 which is a micro-section shown in a 200:1 enlargement, with the righthand half A of FIG. 4 showing a cast alloy of type $AlSi_9Cu$; and the lefthand half B of the Figure showing a tribologically optimised surface layer with finely dispersed primary silicon precipitations. In the present example, the primary Si percentage amounts of 10%, the primary phase diameter to 4.4 μm and the distance between the Si primary phases to 13 μm.

As far as the load bearing capacity of the new material is concerned, particular significance has to be attached to the bonding of the alloyed-on zone B with the matrix structure A. It can be seen at the micro-section 4 that the transition zone C does not contain any oxides or other defects. This is due to the fact that the alloyed-on zone was produced practically "in situ" from the matrix structure, thus achieving a uniform material with different compositions in regions A and B.

List of Reference Numbers Appearing in the Figures

1. powder supply means

1*a* end of powder supply means

1*b* nozzle

2. laser beam device

3. focusing system

4. deflecting mirror

5 running face

6 laser beam

7 running face surface

8 Cylinder axis

9. -

10. alloyed-on zone

11. zone high in precipitations

12, 13 zone low in precipitations

14. -

15, 16, 17 boundary zones $M_K$ percentage of material $L_{NK}$ effective length of structure high in precipitations $L_{NL}$ effective length of zone high in precipitations $L_{AL}$ percentage of zone low in precipitations $L_{AK}$ regions associated with the interface zones $DH_{WK}$ material removed in comparative example $DH_{WL}$ material removed in example according to the invention A matrix structure B alloyed-on zone C transition zone.

What is claimed:

1. A device for coating a running surface of a hollow cylinder, comprising powder supply means, a laser beam device and a focusing system with a deflecting mirror, characterized in that the powder supply means and the laser beam device are guided parallel relative to one another in the radial and axial direction of the hollow cylinder; that the focusing system comprises a linear beam exit with a beam width of at least about 2.0 mm; and that the powder supply means are provided with a metering device by means of which the volume flow of the powder can be set as a function of the speed of feed of the laser beam.

2. The device according to claim 1, characterized in that the focusing system comprises an X-, I- or 8-like focus shape which, in the upper and lower surface zones, permits a higher energy output than in the central focus region.

3. The device according to claim 1, wherein the focusing system comprises a linear beam exit width of about 2.0 to 2.5 mm.

* * * * *